United States Patent
Novikov et al.

(10) Patent No.: US 10,752,734 B2
(45) Date of Patent: *Aug. 25, 2020

(54) HIGH PERFORMANCE POLYMIDE AND PROCESS THEREFOR

(71) Applicant: United Technologies Corporation, Farmington, CT (US)

(72) Inventors: Dmitri Novikov, Avon, CT (US); David Ulrich Furrer, Marlborough, CT (US); Sergei F. Burlatsky, West Hartford, CT (US); Hillary Anne Huttenhower, East Hartford, CT (US); Vadim V. Atrazhev, Moscow (RU); Vadim I. Sultanov, Moscow (RU); Dmitry Dmitriev, Moscow (RU); John D. Riehl, Hebron, CT (US); Charles R. Watson, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,462

(22) Filed: Jan. 15, 2018

(65) Prior Publication Data

US 2018/0148542 A1 May 31, 2018

Related U.S. Application Data

(63) Continuation of application No. 14/921,177, filed on Oct. 23, 2015, now Pat. No. 9,884,939.

(30) Foreign Application Priority Data

Oct. 24, 2014 (RU) .................... 2014142924

(51) Int. Cl.
*C08J 3/28* (2006.01)
*C08J 3/18* (2006.01)
(Continued)

(52) U.S. Cl.
CPC ............ *C08G 73/1085* (2013.01); *C08J 3/18* (2013.01); *C08J 3/24* (2013.01); *C08J 3/28* (2013.01);
(Continued)

(58) Field of Classification Search
USPC .................................. 528/322, 480; 523/300
See application file for complete search history.

(56) References Cited

U.S. PATENT DOCUMENTS 3,820,290 A * 6/1974 Erikson ...................... C08J 3/24
51/298
3,926,889 A 12/1975 Duchesneau, Jr. et al.
(Continued)

FOREIGN PATENT DOCUMENTS

EP 0470446 A1 2/1992
RU 2311031 C1 11/2007
(Continued)

OTHER PUBLICATIONS

European Office action dated Mar. 8, 2018 for corresponding European Patent Application 15189542.2.
(Continued)

*Primary Examiner* — Tae H Yoon
(74) *Attorney, Agent, or Firm* — Bachman & LaPointe, P.C.

(57) ABSTRACT

A polymeric material process includes increasing a mobility within a polymer to enables specific alignment of polymer chains.

2 Claims, 1 Drawing Sheet

(51) Int. Cl.
  *C08J 3/24* (2006.01)
  *C08G 73/10* (2006.01)
  *C08K 3/01* (2018.01)
  *C08K 5/00* (2006.01)
  *C08L 79/08* (2006.01)
  *C08K 3/013* (2018.01)

(52) U.S. Cl.
  CPC ............... *C08K 3/01* (2018.01); *C08K 3/013* (2018.01); *C08K 5/0016* (2013.01); *C08L 79/08* (2013.01); *C08J 2379/08* (2013.01)

(56) References Cited

U.S. PATENT DOCUMENTS

| | | |
|---|---|---|
| 4,944,824 A | 7/1990 | Gupta |
| 5,037,041 A | 8/1991 | Unterhitzenberger |
| 5,057,174 A | 10/1991 | Anderson et al. |
| 5,059,273 A | 10/1991 | Boyce et al. |
| 5,071,506 A | 12/1991 | Nelson et al. |
| 5,087,193 A | 2/1992 | Herbert, Jr. |
| 5,262,121 A | 11/1993 | Goodno |
| 5,433,902 A | 7/1995 | Leyderman |
| 5,454,895 A | 10/1995 | Imparato |
| 5,469,686 A | 11/1995 | Pykiet |
| 5,487,854 A | 1/1996 | Leoni |
| 5,538,680 A | 7/1996 | Enders |
| 5,683,646 A | 11/1997 | Reiling, Jr. |
| 5,688,848 A | 11/1997 | Cella et al. |
| 5,702,639 A | 12/1997 | Escher et al. |
| 5,851,564 A | 12/1998 | Triandafilou |
| 6,458,309 B1 | 10/2002 | Allen et al. |
| 6,759,096 B2 * | 7/2004 | MacQueen ............ B05D 5/061 427/261 |
| 6,777,525 B2 * | 8/2004 | Pater ................. C08G 73/1014 264/297.1 |
| 7,059,034 B2 | 6/2006 | Anderson et al. |
| 7,431,239 B2 | 10/2008 | Anderson et al. |
| 9,884,939 B2 * | 2/2018 | Novikov ............ C08G 73/1085 |
| 2004/0224139 A1 | 11/2004 | Backhouse |
| 2005/0074593 A1 | 4/2005 | Day et al. |
| 2005/0211843 A1 | 9/2005 | Simpson et al. |
| 2006/0086735 A1 | 4/2006 | Weerth |
| 2008/0051866 A1 | 2/2008 | Chen et al. |
| 2008/0157063 A1 | 7/2008 | Sydorenko et al. |
| 2011/0018424 A1 | 1/2011 | Takada |
| 2011/0052821 A1 | 3/2011 | Ishizuka et al. |
| 2013/0340520 A1 | 12/2013 | Cherepnin |
| 2014/0284821 A1 | 9/2014 | Hubbard |
| 2015/0359647 A1 | 12/2015 | Pacetti et al. |

FOREIGN PATENT DOCUMENTS

| | | |
|---|---|---|
| RU | 2398798 C1 | 9/2010 |
| SU | 606332 A1 | 9/1985 |
| WO | 0216463 A2 | 2/2002 |
| WO | 2004065615 A2 | 8/2004 |
| WO | 2012125129 A1 | 9/2012 |

OTHER PUBLICATIONS

James Loomis et al.; Continuous Fabrication Platform for Highly Aligned Polymer Films, World Scientific Publishing Co. Technology/Imperial College Press, vol. 2, No. 3; Sep. 1, 2014, pp. 189-199, XP002741135; ISSN: 2339-5478, DOI: 10.1142/S2339547814500216. Retrieved from the Internet: URL:http://www.researchgate.net/profile/Hadi_Ghasemi10/publication/265462855_continous_fabrication_platform_for_highly_aligned_polymer_films/links/540f19840cf2f2b29a3dd2bd.pdf.

Russian Office action dated Dec. 14, 2018 for corresponding Russian Patent Application 2014142924.

Russian Office action dated Jul. 3, 2018 for corresponding Russian Patent Application No. 2014142924.

\* cited by examiner

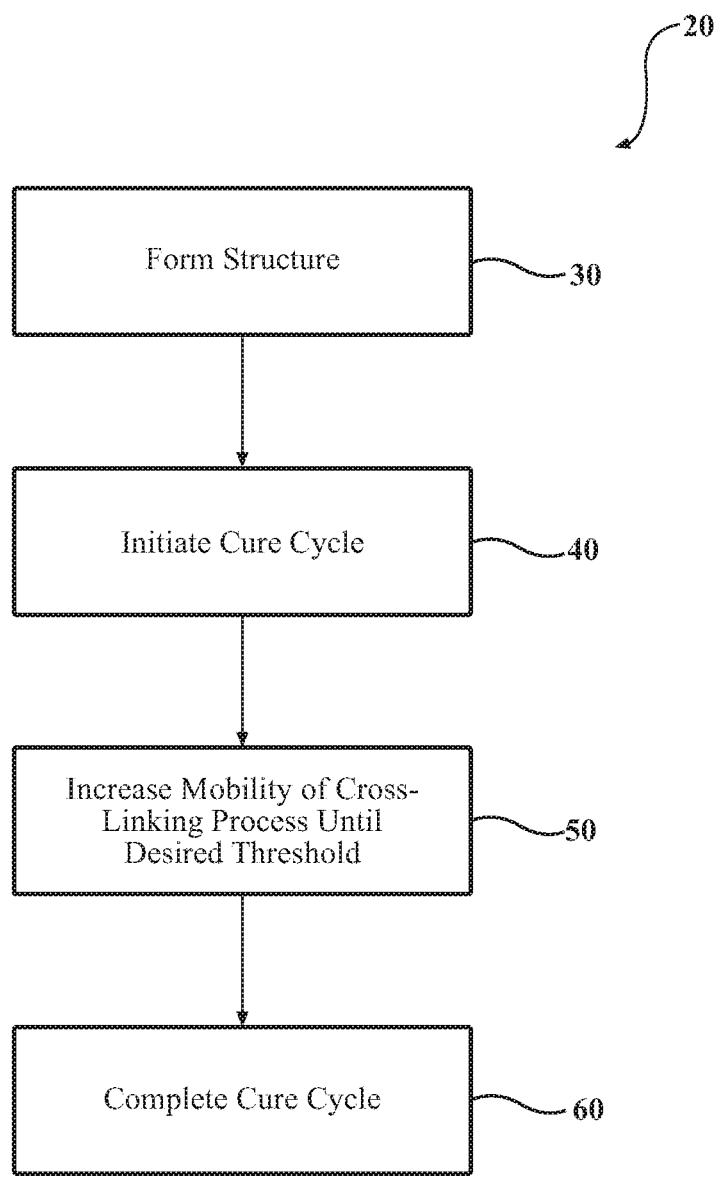

1

HIGH PERFORMANCE POLYMIDE AND PROCESS THEREFOR

CROSS-REFERENCE TO RELATED APPLICATIONS

This application is a Continuation of U.S. patent application Ser. No. 14/921,177, filed Oct. 23, 2015, now U.S. Pat. No. 9,884,939, which claims priority of RU 2014142924, filed Oct. 24, 2014.

BACKGROUND

The present disclosure relates to the production of a polymer composite component with increased compaction, alignment, and degree of cure through the increase of chain mobility.

Organic compounds have been developed and used for a range of applications. Polymers, as a class of organic compounds, have been designed to be applied as monolithic materials or as matrices for composite structures reinforced with various types of fibers or particulates. There are two major forms of polymeric materials: thermoplastic and thermoset compounds.

Thermoplastic materials rely on organic molecules with a range of chain lengths and a range of pendent features from none to complex aromatics. These polymers are broadly classified by the ability to heat the material and form it into shapes. This can be accomplished by allowing discrete polymer chains to move about each other freely with the exception of physical tangles. These materials can be heated, shaped, and cooled repeatedly with no change in or loss of material properties. Thermoset compounds have the added complexity of cross-linking to a level where thermal energy input does not allow further mobility of the prior individual organic molecules. Once these compounds are formed, they cannot be re-heated and re-shaped as heating does not return the material to its original uncured state. These compounds are very stable relative to dimension, as crystallization cannot readily progress once the final cross-linked component is formed. Of the two main types of polymers, thermoset compounds are more capable of stability at very high temperatures and are relatively capable of resisting environmental attack.

As applications expand, there is a growing need to increase the effective operating temperature and environmental capabilities of organic polymeric materials. As polymeric materials are increased in temperature, they can degrade by breaking of bonds within the polymeric structure or by further reaction of the polymer with other chemical species, effectively changing the entire make-up and capability of the material. To increase the temperature and environmental capability of high performance polymeric materials, increased quantity and strength of inter-chain interactions, bonding, and cross-linking are desired. These interactions between chains can be of several types, including covalent cross-link bonds, ionic bonds and weaker Van der Waals forces from polar molecule sites.

Recent work has shown that simple polymeric materials, such as polyethylene can be processed by strain from extrusion or other mechanical deformation processes to align and bring long polymer chains into very orderly close proximity to facilitate formation of large numbers of Van der Waals forces. This results in greatly increased strength, strain to failure, and overall toughness of this high molecular weight polyethylene. An example of such material is commercially known as Dynema.

Though this material has greatly improved low temperature capabilities, it is still not well suited for high temperature applications in challenging environments, such as that required for demanding aerospace applications. To support truly increased temperature capabilities and environmental stability, polymers with enhanced cross-linking and strong pendent groups are desired. The current highest performance polymer materials used in aerospace applications are based on polyimides. These materials have maximum long term continual use temperature capabilities in the range of 550-600 F (288-316 C). These materials, like other organic materials, are challenged in elevated temperature, high humidity environments (hot/wet conditions). Water ingress into the polymers may also result in loss of inter-chain strength and overall degradation of material properties.

SUMMARY

A polymeric material process according to one disclosed non-limiting embodiment of the present disclosure includes increasing mobility transiently within a polymer to enable specific alignment of polymer chains.

A further embodiment of the present disclosure includes, wherein the polymer includes a thermosetting material.

A further embodiment of any of the foregoing embodiments of the present disclosure includes, wherein increasing mobility is achieved by adding a plasticizer.

A further embodiment of any of the foregoing embodiments of the present disclosure includes, wherein the plasticizer includes $H_2O$.

A further embodiment of any of the foregoing embodiments of the present disclosure includes, wherein the plasticizer includes $CO_2$.

A further embodiment of any of the foregoing embodiments of the present disclosure includes, wherein the plasticizer is removed prior to completion of a curing cycle.

A further embodiment of any of the foregoing embodiments of the present disclosure includes, wherein increasing mobility is achieved by a pulsed electrical field.

A further embodiment of any of the foregoing embodiments of the present disclosure includes, wherein increasing mobility is achieved by ultrasonic bombardment.

A polymeric material process according to another disclosed non-limiting embodiment of the present disclosure includes initiating a curing cycle of a polymer; increasing a mobility within the polymer during the curing cycle; and ceasing the increasing of the mobility at a desired threshold prior to completion of the curing cycle.

A further embodiment of any of the foregoing embodiments of the present disclosure includes, wherein increasing mobility is performed in a transient manner.

A further embodiment of any of the foregoing embodiments of the present disclosure includes, wherein increasing mobility is achieved by adding a plasticizer.

A further embodiment of any of the foregoing embodiments of the present disclosure includes, wherein the plasticizer is removed after a preferred alignment of a molecule chain of the polymer is completed.

A further embodiment of any of the foregoing embodiments of the present disclosure includes, wherein the plasticizer is removed prior to completion of a curing cycle.

A further embodiment of any of the foregoing embodiments of the present disclosure includes, wherein increasing mobility is achieved by a pulsed electrical field.

A further embodiment of any of the foregoing embodiments of the present disclosure includes, wherein increasing mobility is achieved by ultrasonic bombardment.

A polymeric material according to another disclosed non-limiting embodiment of the present disclosure includes a thermoset material with a thermal oxidative stability of less than or equal to about 2.2% weight loss at about at 650° F. (343° C.) with ambient pressure for 1000 hrs, a Dry Glass Transition Temperature (Tg) greater or equal to about 700° F. (371° C.), and a Hot/Wet Glass Transition Temperature (Tg) greater or equal to about 690° F. (366° C.).

A further embodiment of any of the foregoing embodiments of the present disclosure includes, wherein the polymeric material is a polyimide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 1 is a schematic of a process diagram illustrating a process of manufacturing a thermosetting compound according to one disclosed non-limiting embodiments.

DETAILED DESCRIPTION

FIG. 1 schematically illustrates a polymeric material process 20 for curing a thermosetting material to form a polymer composite component such as an aerospace component. The thermosetting material may be a thermosetting resin material that is often referred to as a thermoset, e.g., a petrochemical material that irreversibly cures.

The polymeric material process 20 initiates with a composite material that is formed into a structure via fabrication tooling or other preparations such as prepreg autoclave processing, resin infusion techniques, or combinations of these techniques (step 30). The composite material may be of any high or low temperature thermoset composites matrix, such as pre-preg tow, resin infusion, resin transfer molding (RTM), resin film infusion (RFI), wet lay-up, and the like.

Next, a cure cycle is initiated (step 40). The cure cycle may be induced by heat, through a chemical reaction, or other suitable irradiation with, or without a vacuum. The curing cycle transforms the material by a cross-linking process. Energy and/or catalysts are added that cause the molecular chains to react at chemically active sites, unsaturated or epoxy sites, for example, linking into a rigid, 3-D structure. The cross-linking process forms a molecule with a larger molecular weight which results in a material with a higher melting point. During the reaction, the molecular weight has increased to a point such that the melting point is higher than the surrounding ambient temperature, and the material forms into a solid material.

Upon initiation of the cure cycle or subsequent thereto, the mobility of the cross-linking process is increased in a transient manner (Step 50). That is, the increased chain mobility is effectuated until a desired threshold is achieved prior to completion of the cure cycle (Step 60). The increase in the mobility within a polymer enables specific alignment of polymer chains that provide for optimum cross-linking and structure stability from a polar charge standpoint.

The increased alignment and inter-chain bonding provide two major features: increased overall compound strength which enables higher temperature capability; and decreased free volume for water molecules to inhabit which mitigates water ingress and moisture degradation of properties, both of which are particularly advantageous for aerospace components. The aligned polymer chains enable effective chain interaction and cross-linking by covalent bonds and Van der Waals interaction when the polymer chains are aligned with favorable positions between chains. The increased chain mobility may be obtained via, for example, the addition of a plasticizer, electrical pulses, ultrasound, pressure cycling during material processing, and environmental manipulation during material processing.

In one disclosed non-limiting embodiment, the increased mobility is achieved by the addition of a plasticizer that enables the increased chain mobility, but can then be readily removed after at the desired threshold and alignment of the molecule chains is completed. Examples of this approach include additions of $H_2O$, $CO_2$ or other species that can be readily extracted prior to completion of the cure (Step 60). In another disclosed non-limiting embodiment, the increased mobility is achieved by a pulsed electrical field that enables increased incremental movement of molecules through manipulation of electronic charges. These approaches have experimentally shown an effective capability of increasing chain mobility that enables placement of individual molecule charges in desired positions and alignment to each other. These approaches have experimentally shown to be particularly applicable to the processing of relatively complicated polymers such as polyimides.

In still another disclosed non-limiting embodiment, the increased mobility is achieved by ultrasonic bombardment. Ultrasound approaches have experimentally shown to be particularly applicable to the processing and increase chain mobility of polymeric materials.

It should be appreciated that the desired threshold may be related to, for example, a desired density, temperature, time, or other property level prior to completion of the cure cycle (Step 60). That is, the desired threshold for the polymeric material process 20 may be defined experimentally, to form a "recipe" which allows production level repetition. In other words, the polymeric material process 20 enables modeling and prediction of polymer mobility as a function of polymer type (base compound, pendent structures, chirality, and molecular weight), as well as processing conditions.

The polymeric material process 20 in which the mobility of the cross-linking process is increased in a transient manner produces the desired amount of cross-linking (covalent bonding or Van der Waals interactions) to enhance target properties such as increased temperature, mechanical properties, and environmental resistance. One example, polymeric material manufactured according to the process 20 provides a combination of properties that include thermal oxidative stability of less than or equal to about 2.2% weight loss at about at 650° F. (343° C.) with ambient pressure for 1000 hrs, Dry Glass Transition Temperature (Tg) greater or equal to about 700° F. (371° C.), and a Hot/Wet Glass Transition Temperature (Tg) greater or equal to about 690° F. (366° C.).

The high mobility phase and alignment of polymer chains can be measured experimentally to facilitate optimization of high performance polymers and the methods necessary for their production. The process can be readily established to increase the mobility of organic polymers leading to effective alignment of chains with good packing, high density, and well cross linked stable structures with resultant improved hot wet performance.

There are multiple benefits that result from the production of a polymer composite component (complex geometry parts or simple standard products, such as fibers, films, sheets, blocks or other standard configurations) with increased compaction, alignment, and degree of cure through the increase of chain mobility. These include higher molecular weight structures, increased strength, increased toughness, increased temperature capability before breakdown of the molecular structure, and resistance to water ingress or other environmental degradation which increases hot/wet mechanical and thermal properties. While focused on thermoset materials, the process may also be applied to the alignment of thermoplastic materials, just without the cross linking.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A polymeric material process, comprising:
initiating a curing cycle of a polyimide that transforms the polyimide by a cross-linking process to have a larger molecular weight with a higher melting point;
increasing mobility transiently within a polyimide during the curing cycle to enable specific alignment of polyimide chains, wherein increasing mobility is achieved by a pulsed electrical field; and
ceasing the increasing of the mobility at a desired threshold after a predetermined alignment of a molecule chain of the polyimide prior to completion of the curing cycle by stopping the pulsed electrical field, wherein the molecular weight is increased to a point such that the melting point is higher than the surrounding ambient temperature to form the polymeric material.

2. A polymeric material process, comprising:
initiating a curing cycle of a polyimide that transforms the polyimide by a cross-linking process to have a larger molecular weight with a higher melting point;
increasing mobility transiently within the polyimide during the curing cycle to enable specific alignment of polyimide chains, wherein increasing mobility is achieved by ultrasonic bombardment; and
ceasing the increasing of the mobility at a desired threshold after a predetermined alignment of the molecule chain of the polyimide prior to completion of the curing cycle by ceasing the ultrasonic bombardment, wherein the molecular weight is increased to a point such that the melting point is higher than the surrounding ambient temperature to form the polymeric material.

* * * * *